United States Patent [19]

Teramachi

[11] Patent Number: 4,557,532
[45] Date of Patent: Dec. 10, 1985

[54] CURVILINEAR BEARING UNIT

[76] Inventor: Hiroshi Teramachi, 2-34-8, Higashi-Tamagawa, Setagaya-Ku, Tokyo, Japan

[21] Appl. No.: 609,085

[22] Filed: May 11, 1984

[30] Foreign Application Priority Data

May 11, 1983 [JP] Japan ................................. 58-80968

[51] Int. Cl.$^4$ ........................ F16C 29/06; F16C 13/00
[52] U.S. Cl. .................................... 308/6 C; 384/549
[58] Field of Search .............. 308/6 C, 6 R, 3 A, 3 R, 308/203; 384/549

[56] References Cited

U.S. PATENT DOCUMENTS

| | | | |
|---|---|---|---|
| 640,397 | 1/1900 | Merker | 308/6 C X |
| 2,744,798 | 5/1956 | McCoy | 308/6 C |
| 3,008,774 | 11/1961 | Morris et al. | 308/6 C |
| 3,934,946 | 1/1976 | Burr et al. | 308/6 C |
| 4,332,426 | 6/1982 | Speicher | 308/6 C X |
| 4,384,859 | 5/1983 | Teramachi | 308/6 C X |

FOREIGN PATENT DOCUMENTS 24218 3/1981 Japan ................................. 308/203

Primary Examiner—Stuart S. Levy
Assistant Examiner—Thomas R. Hannon
Attorney, Agent, or Firm—Armstrong, Nikaido, Marmelstein & Kubovcik

[57] ABSTRACT

Disclosed is a curvilinear bearing unit for providing a smooth guide for rotational or curvilinear motion of machine parts. The curvilinear bearing unit includes a bearing block having a curvilinear side surface having a radius of curvature substantially equal to that of an annular track base around which the bearing unit rotates, the bearing block having two loaded ball grooves formed in the curvilinear surface so as to extend along the length of the bearing block and two non-loaded ball bores formed in the solid portion of the bearing block and suitably spaced from the loaded ball grooves. End plates are attached to both longitudinal ends of the bearing block and have ball guides for guiding balls running between the loaded ball grooves and corresponding non-loaded ball bores. A retainer for retaining balls running along the loaded ball grooves is attached to the bearing block. Two loaded ball grooves are formed in the outer peripheral surface of the annular track base so as to oppose the loaded ball grooves in the curvilinear surface of the bearing block. A plurality of balls are disposed to run along endless ball passages formed by the loaded ball grooves, ball guides and the non-loaded ball bores.

6 Claims, 18 Drawing Figures

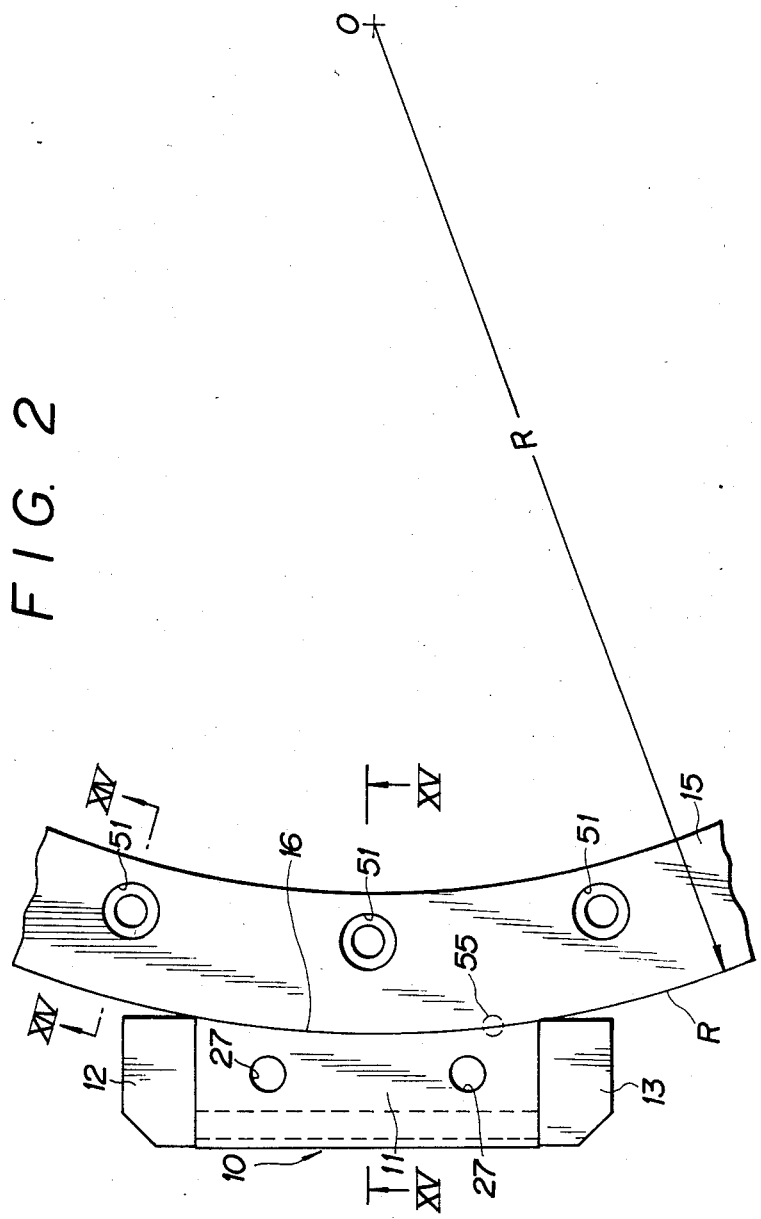

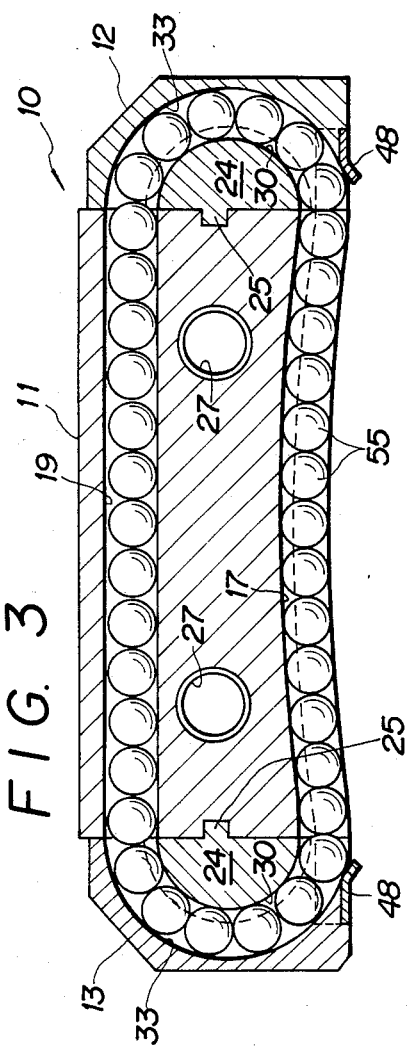
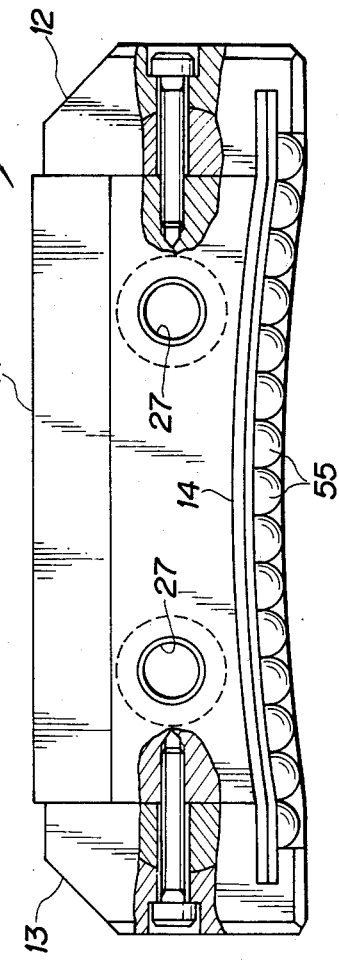

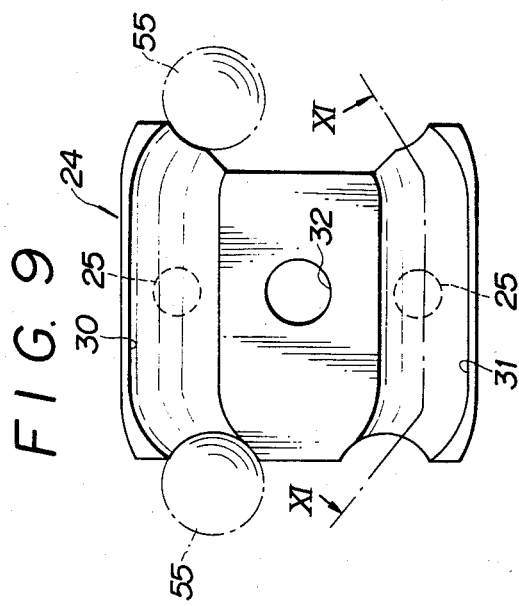
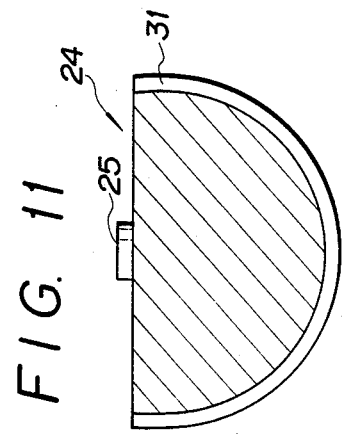
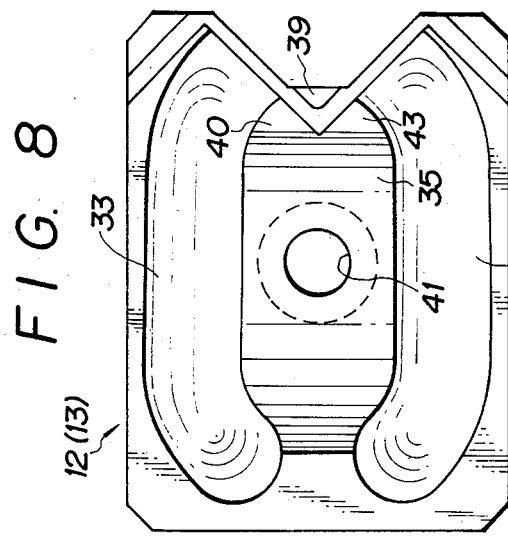
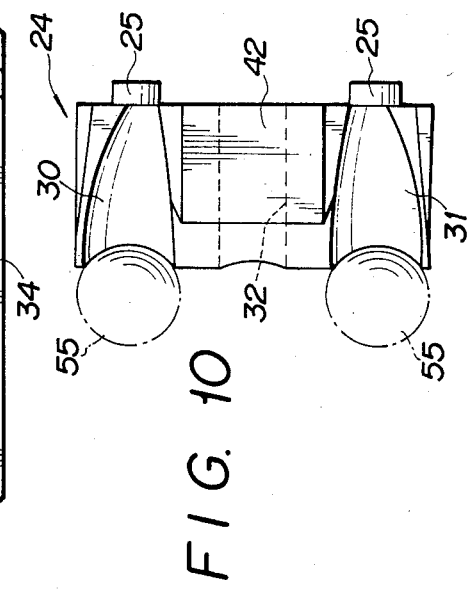

CURVILINEAR BEARING UNIT

BACKGROUND OF THE INVENTION

The present invention relates to a curvilinear bearing unit for providing a guide for rotational or curvilinear motion of a machine part around a stationary part.

Hitherto, various types of swivel-type bearing apparatus have been proposed and used for providing a smooth guide for a rotational machine part such as turn tables, as well as machine parts having arms which which make swivel motion within a limited angular range such as track cranes, welding robots, manipulators, medical instrument and so forth. One of these known bearing apparatus, referred to as "cross roller bearing", has V-shaped grooves spaced 90° apart in a split-type inner race or outer race, and a plurality of rollers arranged in these grooves alternatingly in a crossing manner and retained by a spacer retainer, the spacer retainer separating adjacent rollers to prevent any skew of the rollers and to avoid friction between these rollers.

This cross roller bearing, however, suffers from the following disadvantages. Namely, since the rollers are arranged at a constant pitch around the inner race, this type of bearing can have only small resistance to a concentration of the load, although it has a large load carrying capacity when the load is uniformly distributed over the entire circumference of the inner race. In addition, since the outer race completely surrounds the inner race through the intermediary of the rollers, it is quite difficult to adjust the clearance or gap between the races and, hence, to suitably preload the bearing.

Another bearing which is usually referred to as "wire race ball bearing" is known as a bearing apparatus suitable for use in large-scale machines. In this bearing apparatus, four endless steel wires are disposed between an outer race and a split-type inner race. Balls are disposed to run along the tracks provided by the steel wires. Coil springs serving as spacer/retainers are disposed between respective adjacent balls. This type of bearing apparatus, however, requires a highly precise finishing of the junction between the ends of each wire. In addition, it is necessary to conduct a running-in before the apparatus is put into normal service, in order to obtain a good smoothness of the track surfaces provided by the endless wire steels.

Still another bearing apparatus referred to as "ball race type bearing" is known as a bearing apparatus suitable for large-scale machines. This type of bearing apparatus, however, is extremely difficult to fabricate particularly when the diameter of the outer race is large. Namely, since a large quench-strain is unavoidable, it is necessary to preserve a large grinding margin to eliminate the dimensional error due to the strain. A large grinding margin, however, causes a large distortion due to heat produced during the grinding. The grinding, therefore, has to be made with a small rate of feed of the grinding tool, taking an impractically long period of time. Furthermore, the quenching of the ring as the blank of the outer race has to be made by press quenching, in order to minimize the aforementioned quench strain.

It is to be pointed out also that, in these known bearing apparatus employing split type outer races, it is quite difficult to adjust the radial and axial gaps between the outer and inner races, particularly at the points where the opposing ends of two halves of the outer race are joined.

SUMMARY OF THE INVENTION

Accordingly, an object of the invention is to provide a curvilinear bearing unit which permits a smooth rotational or curvilinear motion with small frictional resistance when used for machine parts which rotate at a constant speed with small fluctuation of load, e.g. a turn table, and which can decrease, when used for swivel parts having arms rotatable within limited angular range, e.g. truck cranes, welding robots, manipulators and medical instruments, the frictional resistance attributable to a moment of force while avoiding application of excessive load to the inner race, i.e. to the annular track base.

To this end, according to the invention, there is provided a curvilinear bearing unit comprising: a bearing block having a curvilinear side surface having a radius of curvature substantially equal to that of an annular track base around which the bearing unit rotates, the bearing block having two loaded ball grooves formed in the curvilinear surface so as to extend along the length of the bearing block and two non-loaded ball bores formed in the solid portion of the bearing block and suitably spaced from the loaded ball grooves; end plates attached to both longitudinal ends of the bearing block and having ball guides for guiding balls running between the loaded ball grooves and corresponding non-loaded ball bores; a retainer for retaining balls running along the loaded ball grooves; two loaded ball grooves formed in the outer peripheral surface of the annular track base and opposing the loaded ball grooves in the curvilinear surface of the bearing block; and a plurality of balls adapted to run along endless ball passages formed by the loaded ball grooves, ball guides and the non-loaded ball bores.

According to this arrangement, it is possible to attain a smooth and rigid guide for rotational or curvilinear motion with curvilinear bearing units having reduced height.

In addition, it becomes possible to easily adjust the gap or play in the curvilinear bearing unit and, hence, to adequately preload the bearing units.

Furthermore, since two rows of balls on the bearing block contact the ball rolling surfaces of the associated track grooves at a contact angle of 45°, a highly compact and stable mechanism can be obtained for guiding a machine part which makes rotational or curvilinear motion.

The above and other objects, features and advantages of the invention will become clear from the following description of the preferred embodiment taken in conjunction with the accompanying drawings.

BRIEF DESCRIPTION OF THE DRAWINGS

FIG. 2 is an enlarged plan view of a part of the turn table as shown in FIG. 1;

FIG. 3 is an enlarged vertical sectional view of the curviliner bearing unit;

FIG. 4 is an enlarged top view of the curvilinear bearing unit.

FIG. 8 is a front elevational view of an end plate;

FIG. 9 is a front elevational view of a ball guide;

FIG. 10 is a side elevational view of the ball guide;

FIG. 11 is a sectional view taken along the line XI—XI of FIG. 9;

DESCRIPTION OF THE PREFERRED EMBODIMENT

Figure 1:
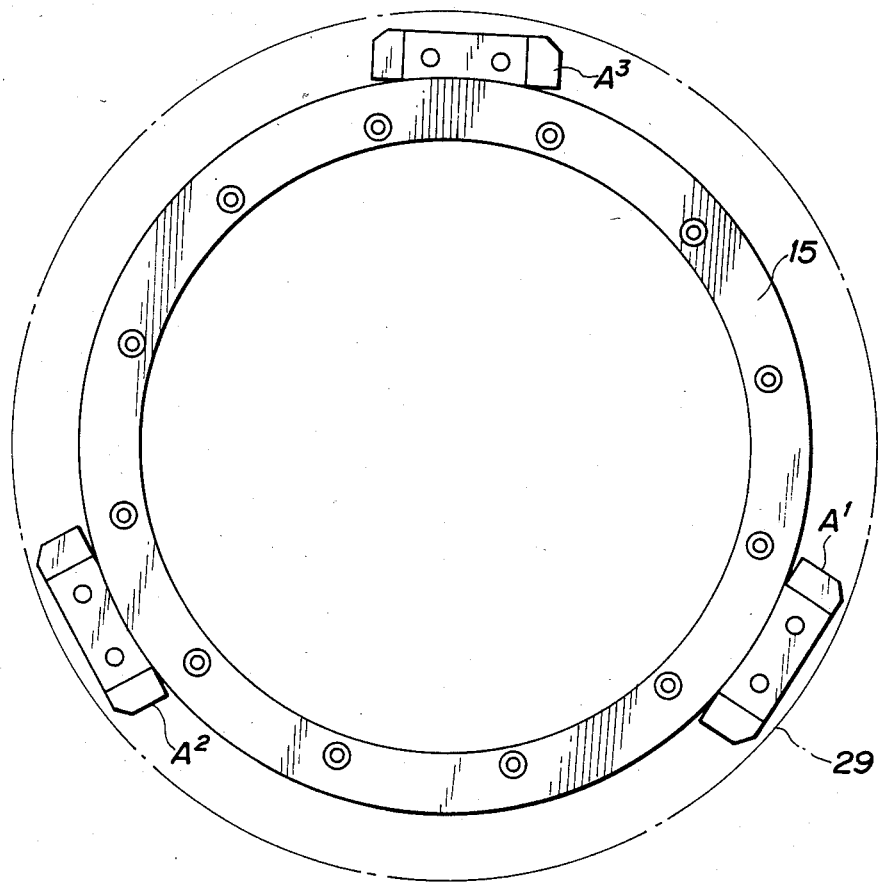
FIG. 1 is a plan view of a turn table incorporating curvilinear bearing units of the invention.
Figure 5:
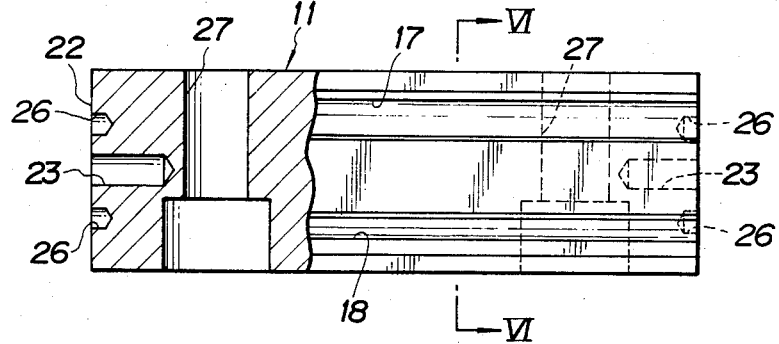
FIG. 5 is a partly-sectioned front elevational view of a curvilinear bearing unit.
Figure 6:
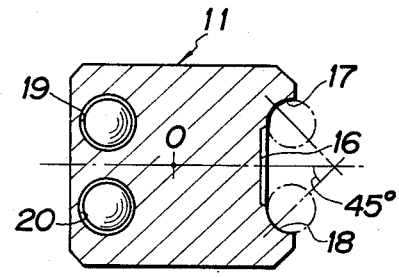
FIG. 6 is a sectional view taken along the line VI—VI of FIG. 5.

FIG. 1 shows a turn table which incorporate a plurality of curvilinear bearing units $A_1$ to $A_3$ in accordance with the invention. Each bearing unit, generally designated by a reference numeral 1, has a bearing block 11, front and rear end plates 12 and 13, and a retainer 14. The bearing block 11 has a curvilinear surface 16 having a radius of curvature which substantially equals the radius R of a stationary annular track base 15. Parallel grooves 17 and 18 constituting passages for loaded balls are formed in the upper and lower end portions of the curvilinear surface 16 along the length of the bearing block 11. These grooves will be referred to as "loaded ball grooves", hereinunder. As will be clearly seen from FIG. 6, the loaded ball grooves 17 and 18 have an arcuate cross-section and are arranged such that the line passing through the center of the curve of each groove and the mid point of the arc of the groove intersect the horizontal neutral line of the bearing block 11 at an angle of 45°. Preferably, the radius of curvature of arcuate sectional shape of each loaded ball groove is selected to be about 52 to 53% of the radius of balls which are adapted to run along these grooves, so that each ball makes contact with the surface of the associated loaded ball groove at two points. The bearing block 11 further has parallel bores 19 and 20 extending along the length thereof and spaced by a suitable distance from each other in the vertical direction as viewed in FIG. 6. These bores 19 and 20 have a diameter slightly greater than that of the ball and constitute passages for non-loaded balls. These bores, therefore, will be referred to as "non-loaded ball bores", hereinunder. The aforementioned end plates 12 and 13 are adapted to be secured to corresponding longitudinal end surfaces 21 and 22 of the bearng block 11. Each of the end surfaces 21 and 22 has a threaded hole 23. The end plate is secured to the associated end surface of the bearing block 11 by a bolt which is screwed into this threaded hole 23. Furthermore, locating holes 26,26 are formed in each end surface of the bearing block 11, for receiving dwell pins 25,25 provided on a ball guide 24 which is incorporated in each end plate.

The bearing block 11 is adapted to be secured to a movable part such as a movable table 29 adapted to rotate around the aforementioned stationary annular track base 15 by means of bolts 28 and 28 which are screwed to the movable table 29 through bores 27 and 27 formed in suitable portions of the bearing block 11. As will be seen from FIG. 11, the ball guide 24 is a member which has a crescent-like planar shape. The ball guide 24 is provided with two guide grooves 30 and 31 on its peripheral surface and also with a central through bore 32 for receiving a screw as will be seen from FIG. 10.

Figure 7:
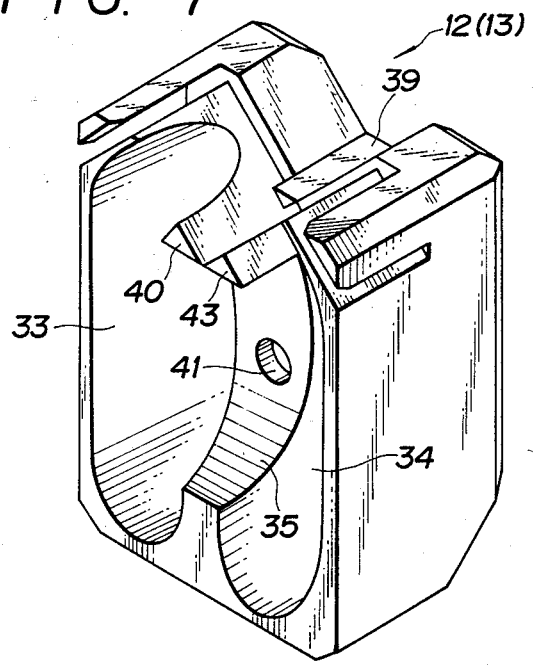
FIG. 7 is a perspective view of an end plate.

Referring now to FIGS. 7 and 8, U-shaped grooves 33 and 34 corresponding to the guide grooves 30 and 31 of the ball guide 24 are formed on both sides of a central partition land 35 on the inner surface of each of the end plates 12 and 13. A slit 36 for receiving the end 37 of the retainer 14 having substantially inverted W-shaped sectional shape is formed in the portion of the inner surface of each end cover adjacent to the loaded ball grooves 17 and 18. A tongue 39 and a V-shaped support 40, which cooperate with each other in holding a central partition piece having a substantially V-shaped section, are formed on the same portion of the inner side of each end plate. The arrangement is such that the upper flat surface of the central partition 35 of each ball guide 24 fits on the lower surface 43 of the V-shaped support member 40. A reference numeral 41 designates a through bore which aligns with the through bore 32 formed in each of the end plates 12 and 13.

Figure 12:
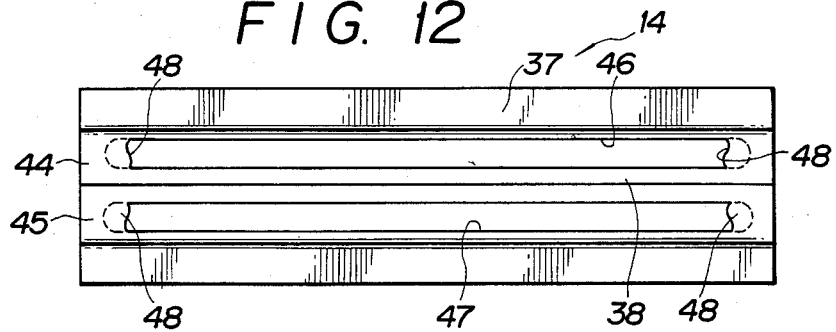
FIG. 12 is a plan view of a retainer.
Figure 13:
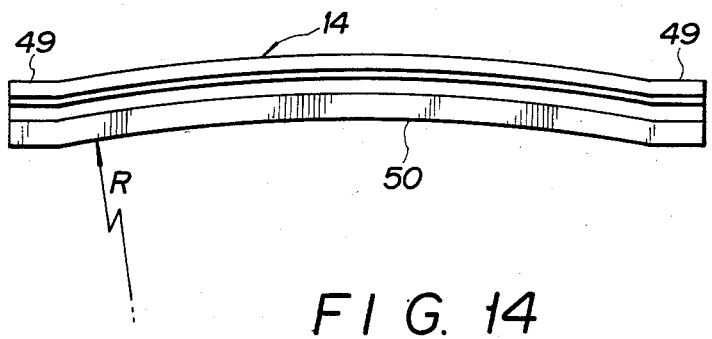
FIG. 13 is a front elevational view of a retainer.
Figure 14:
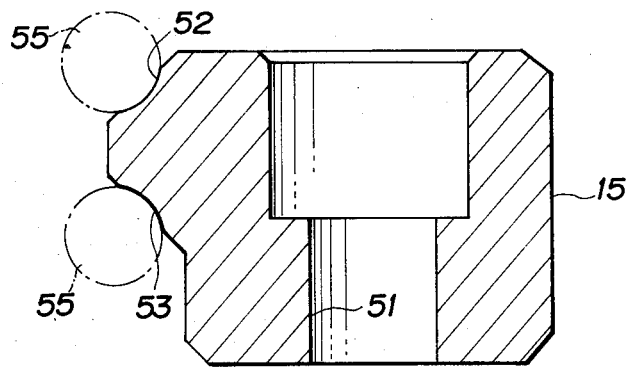
FIG. 14 is a sectional view taken along the line XIV—XIV of FIG. 2.

As will be noted from FIGS. 12 and 13, the retainer 14 is formed from a punched steel sheet bent to have a substantially W-shaped sectional shape. Parallel slits 46 and 47, each having a width somewhat smaller than the diameter of the ball 55, are formed in the inwardly inclined flanks 44 and 45 corresponding to the loaded ball grooves 17 and 18. Tongues 48,48 for guiding the balls are formed on both ends of respective slits 47 and 47. As will be seen from FIG. 13, the retainer 14 has both side surfaces 50 which are slightly curved except both end portions 49 and 49 which are adapted to be held by corresponding end plates 12 and 13. The curved side surfaces 50 have a radius of curvature substantially equal to that of the curved surface 16 of the bearing block 11.

The annular track base 15 has bolt holes 51,51 which are formed at a suitable circumferential pitch. The annular track base 15 is adapted to be fixed to a suitable stationary member or a rotary member (not shown) by means of bolts which are driven through these bolt holes. Parallel grooves 52 and 53 are formed on the outer peripheral surface of the annular track base 15 so as to form passages for the loaded balls, in cooperation with corresponding loaded ball grooves 17 and 18 formed on the bearing block 11. These grooves 52 and 53, therefore, will be referred to as "loaded ball grooves", hereinunder. As in the case of the loaded ball grooves 17 and 18, the loaded ball grooves 52 and 53 have an arcuate sectional shape which is so shaped and sized as to permit the ball 55 to make contact with the groove surface at two points. When the size of the annular track shaft is so large as to make it difficult to fabricate it in a single body, it is advisable to divide the annular track base into a plurality of segments, particularly when the annular track base has to be forwarded to a district where the traffic condition is not good.

In assembling, the ball guides 24 are attached to both longitudinal ends of the bearing body 11 and one 12 of the end plates is fitted to corresponding ball guide 24. The end cover 12 is then fixed to the bearing block 11 by means of a bolt. Then, the retainer 14 is held at its one flat end 49 by the end plate 12, and a predetermined number of balls 15 are put into the ball passages through the non-loaded ball bores 18 and 19. Then, the other end plate 13 is filled with the remainder of the balls and is fixed by means of the bolt, thus completing the assembling.

The curvilinear bearing units $A_1, A_2$ and $A_3$ thus assembled are secured, for example, to the lower side of the turn table 29 at a constant circumferential pitch as shown in FIG. 1, with the loaded balls on the retainer 14 held in contact with the loaded ball grooves 52 and 53 on the annular track base 15. Consequently, the rotary plate 29 can smoothly rotate on the stationary track base 15, through the operation of the curvilinear bearing units $A_1$ to $A_3$.

It will be seen that the curvilinear bearing units in accordance with the invention provides a smooth guide for rotational or curvilinear movement of a machine part, because the balls are smoothly circulated through the ball passages formed in each bearing block and associated end plates. Since these balls effectively decrease the frictional resistance, the loss of driving power during the rotation of the turn table is minimized advantageously.

Figure 17:
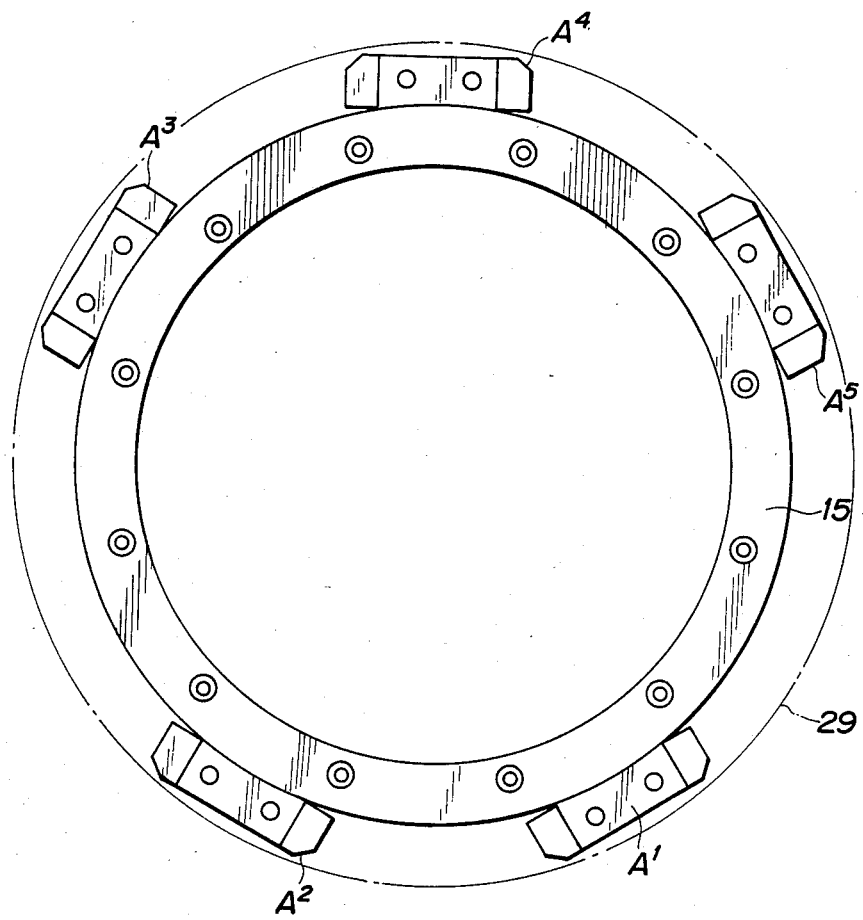
FIGS. 17 and 18 are plan views of different embodiments of turn tables incorporating a curvilinear bearing in accordance with the invention.
Figure 18:
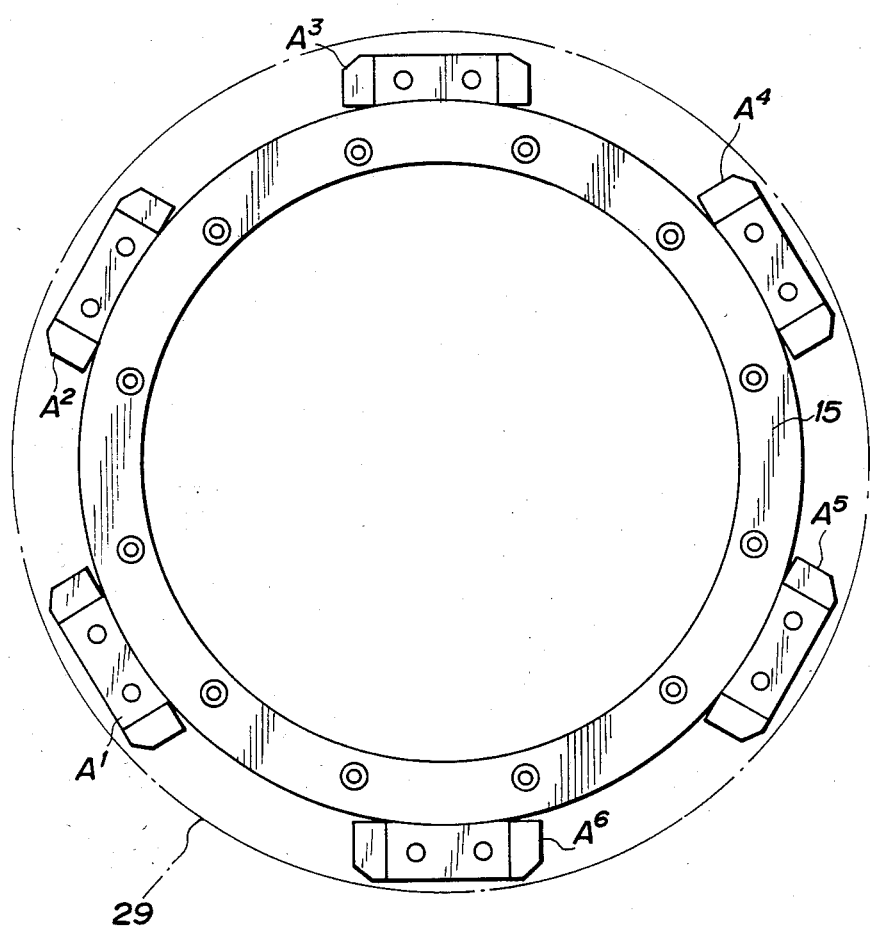

FIG. 17 shows a modification of the mechanism for guiding curvilinear motion. In this modification, the curvilinear bearing units of the invention are secured to the lower side of the turn table at an irregular pitch. This arrangement is suited to such a use that the turn table rotates reciprocatingly within a limited angular range as in the case of a track crane. FIG. 18 shows another modification in which a greater number of curvilinear bearing units $A_1$ to $A_6$ than the embodiment shown in FIG. 1 are arranged at a constant circumferential pitch.

Figure 15:
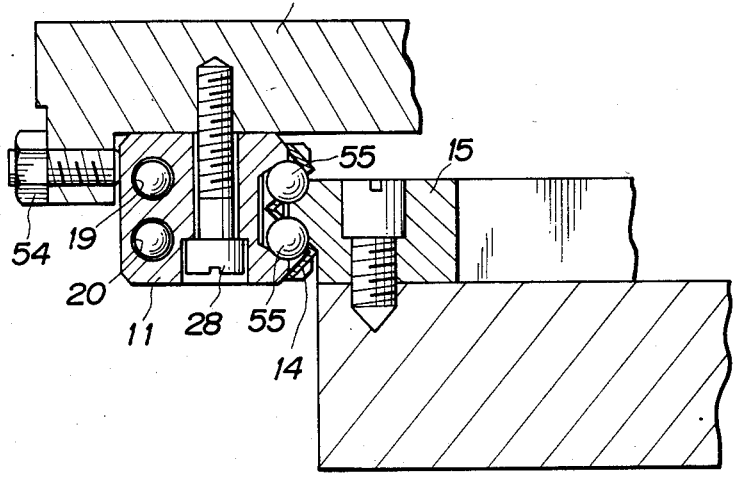
FIG. 15 is a sectional view taken along the line XV—XV of FIG. 2.

A description will be made hereinunder as to the preloading means for preloading the curvilinear bearing unit incorporated in the turn table. FIG. 15 shows an example of such a preloading means. This preloading means has a bolt screwed through a threaded bore formed in a vertical wall portion of the turn table 29. As the screw 54 is driven deeper, it presses the radially outer surface of the curvilinear bearing unit to urge the bearing unit and, hence, the loaded balls towards the annular track base 15, thereby to preload the curvilinear bearing unit.

Figure 16:
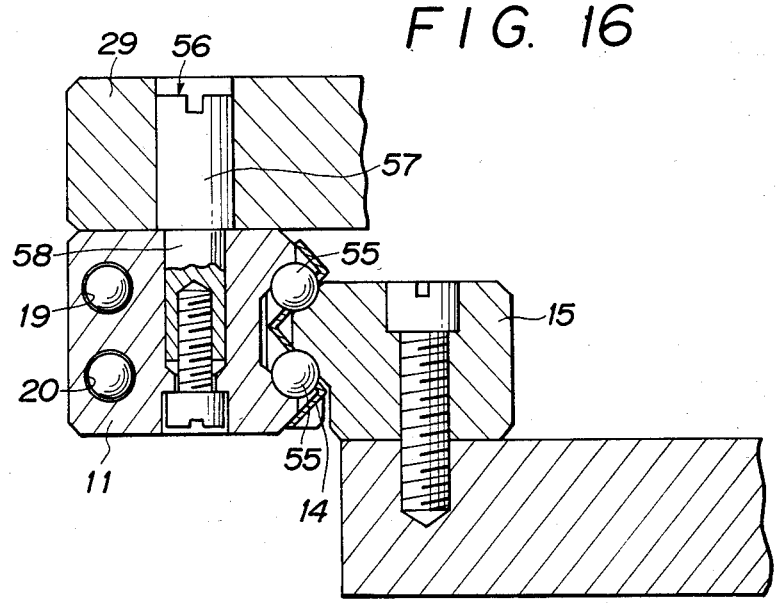
FIG. 16 is a sectional view similar to FIG. 15, showing a modification of a preloading means.

FIG. 16 shows another example of the preloading means employing an eccentric bolt 56 which connects the rotary table 29 to the bearing block 11. More specifically, the eccentric bolt 56 has an upper portion received by a bore in the rotary table 29 and a lower portion 58 which is received by a bore formed in the bearing block 11. The upper portion 57 has an axis which is slightly offset from the axis of the lower portion 58. The lower portion 58 has a threaded bore into which a fixing bolt 59 is screwed. It is, therefore, possible to move the bearing block 11 towards the annular track base 15 thereby to preload the curvilinear bearing unit, by rotating the eccentric bolt 56.

Although the invention has been described through specific terms, it is to be noted here that the described embodiment and examples are only illustrative and various changes and modifications may be imparted thereto without departing from the scope of the invention which is limited solely by the appended claims.

What is claimed is:

1. A curvilinear bearing unit, comprising:
   a track bae having an arcuate outer peripheral surface having two converging flat surfaces and being provided on said converging flat surfaces with a pair of curvilinear loaded ball grooves;
   a bearing block movable along said arcuate outer peripheral surface of said track base and having a curvilinear side surface with a radius of curvature substantially equal to that of said arcute outer peripheral surface of said track base, said curvilinear side surface having two diverging flat surfaces which form an opening having a wide mouth, each of said diverging flat surfaces having a loaded ball groove extending in the longitudinal direction thereof and said bearing block having two non-loaded ball bores formed therein and being spaced from said loaded ball grooves, said two loaded ball grooves in the bearing block being disposed in opposed parallel relation with each other and in face-to-face relation with corresponding loaded ball grooves in said track base with said track base being interposed therebetween;
   end plates attached to the opposite longitudinal ends of said bearing block and each having a pair of connection passages formed therein which connect said loaded ball grooves and the corresponding non-loaded ball bores;
   a plurality of balls movable along endless ball passages formed by said loaded ball grooves, said connection passages and said non-loaded ball bores; and
   a retainer for retaining said balls running along said load ball grooves.

2. A curvilinear bearing according to claim 1, further comprising a preloading means provided on a turn table to which said bearing block is fixed for biasing said bearing block towards said track base.

3. A curvilinear bearing unit according to claim 2, wherein said preloading means includes a bolt which is screwed through a threaded bore formed in said turn table and adapted to press said bearing block towards said annular track base.

4. A curvilinear bearing unit according to claim 2, wherein said preloading means includes an eccentric pin having a first portion received in a bore formed in said turn table and a second portion received in a bore formed in said bearing block, said second portion having an axis which is offset from the axis of said first portion.

5. A swivel ring bearing, comprising:
   a rotary table;
   a track base having two converging flat surfaces and a circular outer surface and said converging flat surfaces each having a circular loaded ball groove;
   a plurality of bearing units being disposed around the circular outer periphery of said track base in circumferentially spaced relation with each other and being fixedly mounted to said rotary table, each of said bearing units comprising,
      a bearing block movable along said arcuate outer peripheral surface of said track base and having a curvilinear side surface with a radius of curvature substantially equal to that of said arcuate outer peripheral surface of said track base, said curvilinear side surface having two diverging flat surfaces which form an opening having a wide mouth, each of said diverging flat surfaces having a loaded ball groove extending in the longitudinal direction thereof and said bearing block having two non-loaded ball bores formed therein and being spaced from said loaded ball grooves, said two loaded ball grooves in the bearing block being disposed in opposed parallel relation with each other and in face-to-face relation with corresponding loaded ball grooves in said track base with said track base being interposed therebetween, end plates attached to the opposite longitudinal ends of said bearing block and each having a pair of connection passages formed therein which connect said loaded ball grooves and the corresponding non-loaded ball bores;

a plurality of balls adapted to run along endless ball passages formed by said loaded ball grooves, said connection passages and said non-loaded ball bores; and a retainer for retaining balls running along said loaded ball grooves.

6. A curvilinear bearing unit according to claim 5, wherein said bearing units are disposed around said track base at equal circumferential intervals.

* * * * *